United States Patent
Lee et al.

(10) Patent No.: US 9,667,027 B2
(45) Date of Patent: May 30, 2017

(54) NANOSECOND PULSE LASER DEVICE AND ALTERNATE LASER WAVELENGTH OUTPUT METHOD THEREOF

(71) Applicants: KOREA RESEARCH INSTITUTE OF STANDARDS AND SCIENCE, Daejeon (KR); PUSAN NATIONAL UNIVERSITY INDUSTRY—UNIVERSITY COOPERATION FOUNDATION, Geumjeong-gu, Busan (KR)

(72) Inventors: Sang-Won Lee, Sejong (KR); Jae Yong Lee, Cheongju-si (KR); Eun-Seong Lee, Daejeon (KR); Changseok Kim, Busan (KR); Gukbin Lim, Busan (KR)

(73) Assignees: Korea Research Institute of Standards and Science, Daejeon (KR); Pusan National University Industry-University Cooperation Foundation, Busan (KR)

( * ) Notice: Subject to any disclaimer, the term of this patent is extended or adjusted under 35 U.S.C. 154(b) by 0 days.

(21) Appl. No.: 15/038,169

(22) PCT Filed: Jul. 8, 2014

(86) PCT No.: PCT/KR2014/006100
§ 371 (c)(1),
(2) Date: May 20, 2016

(87) PCT Pub. No.: WO2015/076474
PCT Pub. Date: May 28, 2015

(65) Prior Publication Data
US 2016/0285231 A1 Sep. 29, 2016

(30) Foreign Application Priority Data
Nov. 21, 2013 (KR) .................. 10-2013-0142422

(51) Int. Cl.
*H01S 3/08* (2006.01)
*H01S 3/094* (2006.01)
(Continued)

(52) U.S. Cl.
CPC ............ *H01S 3/302* (2013.01); *H01S 3/0064* (2013.01); *H01S 3/08004* (2013.01);
(Continued)

(58) Field of Classification Search
CPC .............. H01S 3/08004; H01S 3/0809; H01S 3/094076; H01S 3/302
See application file for complete search history.

(56) References Cited

U.S. PATENT DOCUMENTS

| 4,063,106 A * | 12/1977 | Ashkin | ................... H01S 3/302 359/327 |
|---|---|---|---|
| 2007/0092265 A1 | 4/2007 | Vrazel et al. | |
| 2012/0263196 A1 * | 10/2012 | Pask | ........................ H01S 3/30 372/3 |

FOREIGN PATENT DOCUMENTS

JP 2005/208358 A 8/2005

OTHER PUBLICATIONS

J. Santhanam et al. "Raman-induced spectral shifts in optical fibers: general theory based on the moment method". Science Direct; Optics Communications. Elsevier Science B.V. (2003). pp. 413-420.
(Continued)

*Primary Examiner* — Michael Carter
(74) *Attorney, Agent, or Firm* — Harness, Dickey & Pierce, P.L.C.

(57) ABSTRACT

The present invention relates to a nanosecond pulse laser device. The nanosecond pulse laser device of the present invention comprises: a light source which outputs a nanosecond pulse laser beam; a lens which focuses the laser beam; a Raman shift optical fiber which generates pulse
(Continued)

lasers corresponding to a plurality of wavelengths through stimulated Raman scattering of the focused laser beam; a wavelength divider which divides, from among the pulse lasers, the pulse lasers of a predetermined wavelength; an optical switch which selects the pulse lasers outputted from the wavelength divider to mutually alternate the wavelengths in response to a switch control signal which is applied from the outside; and a wavelength combiner which combines and outputs the pulse lasers whose wavelengths are alternatively outputted from the switch.

9 Claims, 5 Drawing Sheets (51) Int. Cl.
*H01S 3/30* (2006.01)
*H01S 3/16* (2006.01)
*H01S 3/00* (2006.01)

(52) U.S. Cl.
CPC .... *H01S 3/08086* (2013.01); *H01S 3/094042* (2013.01); *H01S 3/094076* (2013.01); *H01S 3/005* (2013.01); *H01S 3/0085* (2013.01); *H01S 3/0092* (2013.01); *H01S 3/1618* (2013.01)

(56) References Cited

OTHER PUBLICATIONS

Ya. M. Linik et al. "Frequency shifting and pulse shaping with photonic-crystal fibers for coherent nonlinear spectroscopy". Journal of Raman Spectroscopy. John Wiley & Sons, Ltd. (2006). pp. 705-711.

International Search Report PCT/ISA/210 for International Application No. PCT/KR2014/006100 Dated Sep. 23, 2014.

* cited by examiner

NANOSECOND PULSE LASER DEVICE AND ALTERNATE LASER WAVELENGTH OUTPUT METHOD THEREOF

CROSS-REFERENCE TO RELATED APPLICATIONS

This U.S. non-provisional patent application claims priority under 35 U.S.C. §119 of Korean Patent Application No. 10-2014-006100, filed on Jul. 8, 2014, the entire contents of which are hereby incorporated by reference.

TECHNICAL FIELD

The present invention disclosed herein relates to a laser device, and more particularly, to a nanosecond pulse laser device capable of obtaining a high-speed image and an alternate laser wavelength output method thereof.

BACKGROUND ART

Typically used laser devices are utilized in various fields. For example, as one of laser devices utilized as medical equipment, there are various optical medical imaging devices.

As such a medical imaging device, there is an optical coherence tomography (OCT) device and the OCT device may acquire a 3-dimensional image having high spatial resolution by using light coherence and capability of minute light concentration. However, the spatial resolution becomes rapidly degraded at a depth of 1 mm or longer due to strong scattering in a living tissue.

As a device for overcoming shortcomings of the OCT device having spatial resolution, there is a photoacoustic imaging device. A photoacoustic imaging device is a device in which high spatial resolution of an optical device and advantages of an acoustic imaging device less influenced by light scattering in a living tissue are combined. In order to obtain a photoacoustic effect, the photoacoustic imaging device requires a wavelength-variable laser having wavelengths strongly absorbed in a specimen. As such a wavelength-variable laser, there are an optical parametric oscillator (OPO) and a dye laser. However, since such a wavelength-variable laser is expensive and has a low pulse repetition rate of 20 kHz or less, it is difficult to obtain a high-speed real-time image.

DISCLOSURE OF THE INVENTION

Technical Problem

The present invention provides a nanosecond pulse laser device, which generates a pulse laser light having a high speed pulse repetition rate, and an alternate laser wavelength output method thereof.

The present invention also provides a nanosecond pulse laser device capable of obtaining a high speed image and an alternate laser wavelength output method thereof.

Technical Solution

An embodiments of the present invention provides a nanosecond pulse laser device including: a light source configured to output laser light of a nanosecond pulse; a lens configured to collect the laser light; a Raman shift optical fiber configured to generate pulse laser lights corresponding to a plurality of wavelengths through stimulated Raman scattering from the collected laser light; a wavelength separator configured to separate pulse laser lights of prescribed wavelengths from among the pulse laser lights; an optical switch configured to select pulse laser lights of which wavelengths are mutually alternated from among the pulse laser lights output from the wavelength separator in response to a switch control signal applied from an outside; and a wavelength coupler configured to couple the pulse laser lights of which wavelengths are alternately output from the optical switch and output the coupled pulse laser light.

In an embodiment, the laser light may be continuous coherent light.

In an embodiment, the nanosecond pulse laser device may further include: an isolator positioned between the light source and the lens and configured to block retro-reflection of the laser light output from the light source.

In an embodiment, the Raman shift optical fiber may be an optical fiber having a highest refractive index at a core of a central portion.

In an embodiment, the nanosecond pulse laser device may further include a waveform generator configured to provide a first operation pulse to the light source and provide a second operation pulse to the optical switch, wherein a time period of the second operation pulse is at least two times of that of the first operation pulse such that an alternate pulse is output from the optical switch, and the time period is reciprocal to a frequency period.

In an embodiment of the inventive concept, an alternate laser wavelength output method of a nanosecond pulse laser device includes: outputting laser light of a nanosecond pulse; outputting the laser light to a Raman shift optical fiber; generating pulse laser lights corresponding to a plurality of wavelengths through stimulated Raman scattering of the Raman shift optical fiber; separating pulse laser lights corresponding to prescribed wavelengths; selecting the separated pulse laser lights to be mutually alternated; and coupling the pulse laser lights of which wavelengths are alternated and outputting the coupled pulse laser light.

In an embodiment, the laser light may be continuous coherent light.

In an embodiment, the Raman shift optical fiber may be an optical fiber having a highest refractive index at a core of a central portion.

In an embodiment, an operation period of an operation pulse for selecting the alternate wavelengths may be at least two times of that of an operation pulse for generating the laser light, and the time period is reciprocal of a frequency period.

Advantageous Effects

A nanosecond pulse laser device according to the present invention may generate a pulse laser light having a high speed pulse repetition rate by using stimulated Raman scattering. In addition, the nanosecond pulse laser device may generate pulse laser light having a high speed pulse repetition rate to obtain a high-speed real-time image.

BEST MODE FOR CARRYING OUT THE INVENTION

Figure 1:
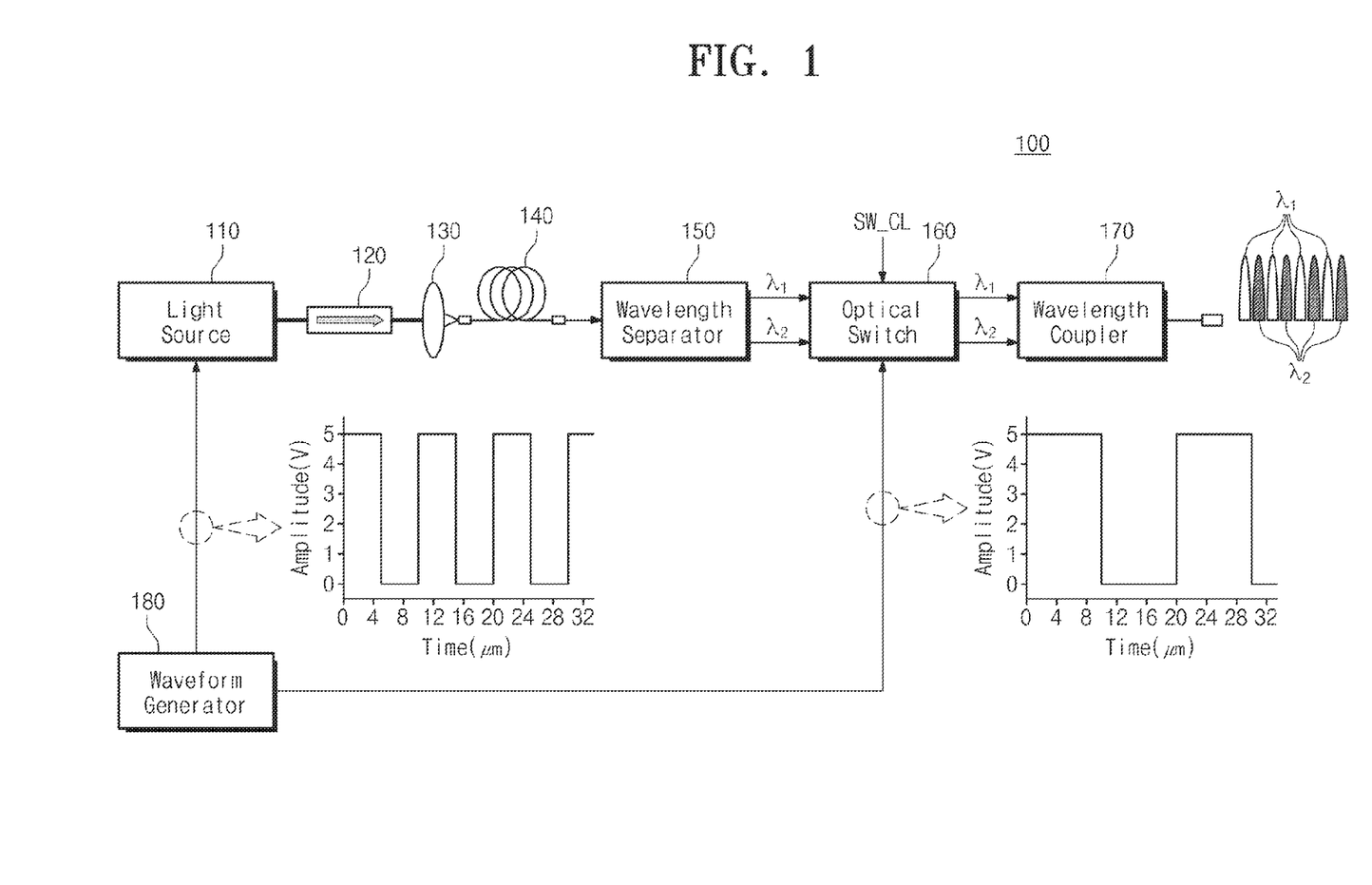
FIG. 1 illustrates an exemplary nanosecond pulse laser device according to the present invention.

A drawing showing a best mode of embodiments of the present invention is FIG. 1.

MODE FOR CARRYING OUT THE INVENTION

Hereinafter, embodiments of the present invention will be described in detail with reference to the accompanying drawings. The following descriptions will be made focusing on configurations necessary for understanding embodiments of the invention. Therefore, descriptions of other configurations that might obscure the gist of the disclosure will be omitted.

The present invention provides a nanosecond pulse laser device for generating a pulse laser light having a high speed pulse repetition rate. Here, the nanosecond pulse laser device may generate pulse laser light having a high speed pulse repetition rate of, for example, about 20 kHz or higher.

FIG. 1 illustrates an exemplary nanosecond pulse laser device according to the present invention.

Referring to FIG. 1, a nanosecond pulse laser device 100 includes a light source 110, an isolator 120, a lens 130, a Raman shift optical fiber 140, a wavelength separator 150, an optical switch 160, a wavelength coupler 170, and a waveform generator 180.

The light source 110 generates nanosecond pulse laser light and outputs the generated laser light to the isolator 120. Here, the laser light is continuous coherent light having a constant period (e.g. from tens Hz to hundreds kHz).

For example, the light source 110 may use an ytterbium fiber laser as a pump source. Here, the ytterbium fiber laser generates a nanosecond pulse laser light having about 532 nm wavelength by frequency-doubling about 1064 nm wavelength. Through this, the light source 110 may output laser light having about 532 nm wavelength.

The isolator 120 outputs input laser light to the lens 130. In addition, the isolator 120 blocks retro-reflection of the laser light in a direction toward the light source 110.

The lens 130 collects the input laser light to the Raman shift optical fiber 140. Through this, the lens 130 delivers the laser light to the Raman shift optical fiber 140.

The Raman shift optical fiber 140 is configured with a material capable of generating Raman scattering stimulated by the input laser light. Through this, the wavelength of the laser light, which is about 532 nm wavelength, is converted by n-th order stimulated Raman scattering.

For example, table 1 represents that the input laser light having about 532 nm wavelength becomes to have wavelengths converted by n-th order stimulated Raman scattering in the Raman shift optical fiber 140.

TABLE 1

| | Input light | 1st order | 2nd order | 3rd order | 4th order | 5th order | 6th order | 7th order |
|---|---|---|---|---|---|---|---|---|
| wavelength (nm) | 532 | 544.7 | 558.1 | 572.2 | 587.0 | 602.5 | 618.9 | 636.3 |

At this point, the input wavelength of 532 nm is changed from the first wavelength of 544.7 nm to the seventh wavelength of 636.3 nm by the Raman shift optical fiber 140. Accordingly, pulse laser lights having wavelengths corresponding to a plurality of orders are output from the Raman shift optical fiber 140.

When the length of the Raman shift optical fiber 140 and the intensity of the input laser light are adjusted, the order of Raman scattering may be determined. Accordingly, the order of the Raman scattering in the Raman shift optical fiber 140 may be 7th order or higher and more wavelengths may be generated.

In this way, by using the simulated Raman scattering of laser light passing through the Raman shift optical fiber 140, the nanosecond pulse laser device 100 does not additionally require a reflector such as a fiber Bragg grid (FBG)

On the other hand, since wavelength conversion due to the Raman scattering has a higher conversion efficiency as the optical fiber is longer and the intensity of light is stronger, a too short optical fiber does not make a sufficient order of Raman scattering and a too long optical fiber has a large energy loss. Regarding this, the length of the Raman shift optical fiber 140 may be determined.

In addition, the Raman shift optical fiber 140 may be formed with a graded-index multimode fiber of which a refractive index is the highest at a center of a core and becomes lowered along toward the outside of the core and claddings. The Raman shift optical fiber 140 formed from the graded multimode optical fiber compensates for velocity differences of lights due to path differences with a uniformly designed refractive index and minimizes spread of a pulse.

Since a pulse laser for photoacoustic imaging is required to output a pulse having a narrow width and energy of 100 nJ or higher, as the repetition rate becomes greater, average energy of the pulse becomes increased. This may be expressed with the following Equation (1).

Pulse energy ($J$)×pulse repetition rate (Hz=1/$s$)=average power ($J/s=W$)      Equation 1

For example, when pulse laser light, which has 532 nm and average power of 700 mW, is concentrated to a single mode fiber, a terminal end thereof becomes burnt due to a thermal damage.

As the pulse energy of a pulse laser for photoacoustic imaging becomes higher, it is advantageous to make a photoacoustic effect. Therefore, a fiber gain medium, which may tolerate high average power, is required to make high pulse energy with pulse laser light having a high speed repetition rate. Accordingly, as the Raman shift optical fiber 140, a multimode fiber or a graded-index multimode fiber in which a core is doped with germanium in order to minimize spread of pulse width may be used.

The wavelength separator 150 separates pulse laser lights having prescribed wavelengths from pulse laser lights corresponding to a plurality of wavelengths. The wavelength separator 150 outputs the separated pulse laser lights to the optical switch 160. For example, the wavelength separator 150 separates two pulse laser lights having wavelengths of $\lambda_1$ and $\lambda_2$ and outputs the separated pulse laser lights to the optical switch 160.

The optical switch 160 alternately selects the input pulse laser lights in response to a switch control signal SW_CL from the outside. The optical switch 160 may alternately select a wavelength corresponding to $\lambda_1$ and a wavelength corresponding to $\lambda_2$ in response to the switch control signal SW_CL.

In the drawing, the optical switch 160 selects pulse laser light corresponding to $\lambda_1$ at a first time, laser pulse light corresponding to $\lambda_2$ at a second time, laser pulse light corresponding to $\lambda_1$ at a third time, and pulse laser light corresponding to $\lambda_2$ at a fourth time. Here, the first to fourth times represent sequential times according to elapse of time. In this manner, the optical switch 160 separates two wavelengths according to a time and alternately outputs the two wavelengths. In other words, the optical switch 160 alternately selects and outputs wavelengths of pulse laser lights.

The wavelength coupler 170 couples and outputs the pulse laser lights output from the optical switch 160. The pulse laser light having the wavelength $\lambda_1$ and the pulse laser light having the wavelength $\lambda_2$ are alternated in a different time interval and input to the wavelength coupler 170. The wavelength coupler 170 couples the pulses having different wavelengths and outputs the coupled pulse.

Through this, wavelengths of pulse laser lights output from the wavelength coupler 170 are alternated and output in a sequence of $\lambda_1$, $\lambda_2$, $\lambda_1$, and $\lambda_2$. In this way, the pulse laser lights output through the wavelength coupler 170 may be used for acquiring images of a subject in a medical imaging device, etc.

The waveform generator 180 generates operation pulses and outputs the generated operation pulses to the nanosecond pulse light source 110 and the optical switch 160. The waveform generator 180 outputs a first operation pulse to the nanosecond pulse light source 110 and a second operation pulse to the optical switch 160. At this point, when a pulse laser light having the first wavelength $\lambda_1$ is selected, a pulse laser light having the second wavelength $\lambda_2$ is not selected, and when the pulse laser light having the second wavelength $\lambda_2$ is selected, the pulse laser light having the first wavelength $\lambda_1$ is not selected. To this end, the waveform generator 180 generates the operation pulses such that a time interval of the second operation pulse is at least two times of a time interval of the first operation pulse. Here, the time interval is reciprocal to a frequency interval.

Here, the first and second operation pulses are represented as a graph, and a horizontal axis of the graph indicates a time (μs) and a vertical axis thereof indicates voltage amplitude (V). Through this, it may be confirmed that the time interval of the second operation pulse doubles that of the first operation pulse.

Through this, the nanosecond pulse laser device 100 proposed in the present invention may output pulse laser lights having a repetition rate adjustable from several kHz to hundreds kHz through stimulated Raman scattering. Through this, the nanosecond pulse laser device 100 proposed in the present invention outputs pulse laser lights capable of obtaining high speed images.

In addition, when a subject is examined with pulse lasers having two or more wavelengths, the nanosecond pulse laser device 100 may alternately output two wavelengths to examine the subject through scanning once, not several times. Accordingly, the nanosecond pulse laser device 100 may obtain a higher speed image by using pulse laser lights having alternated wavelengths.

Figure 2:
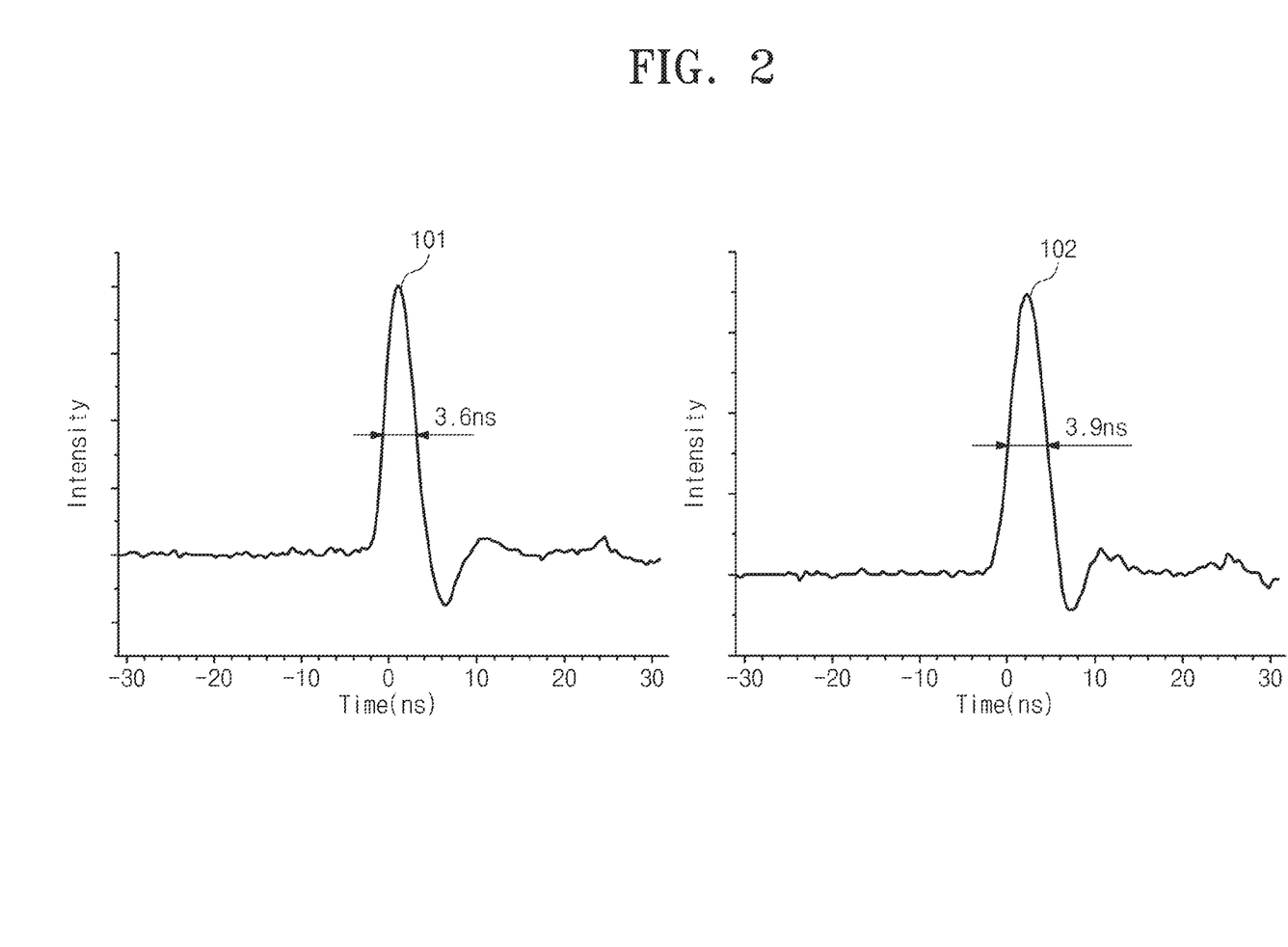
FIG. 2 illustrates an exemplary pulse width change of a pulse laser light according to a stimulated Raman scattering according to the present invention.

FIG. 2 illustrates an exemplary pulse width change of a pulse laser light according to stimulated Raman scattering according to the present invention.

Referring to FIG. 2, horizontal axes of the two graphs indicate a time in ns. Vertical axes of the two graphs indicate intensity.

A pulse width of laser light 101 input to the Raman shift optical fiber 140 is about 3.6 ns. A pulse width of pulse laser light 102 output through the simulated Raman scattering of the Raman shift optical fiber 140 is about 3.9 ns. Here, the pulse laser light 102 has about 602 nm wavelength.

Through this, the pulse laser light output from the Raman shift optical fiber 140 has a sufficiently narrow pulse width of about 10 ns or smaller in order to make a photoacoustic signal. In other words, the pulse laser light output through the Raman shift optical fiber 140 may have a high speed pulse repetition rate.

Figure 3:
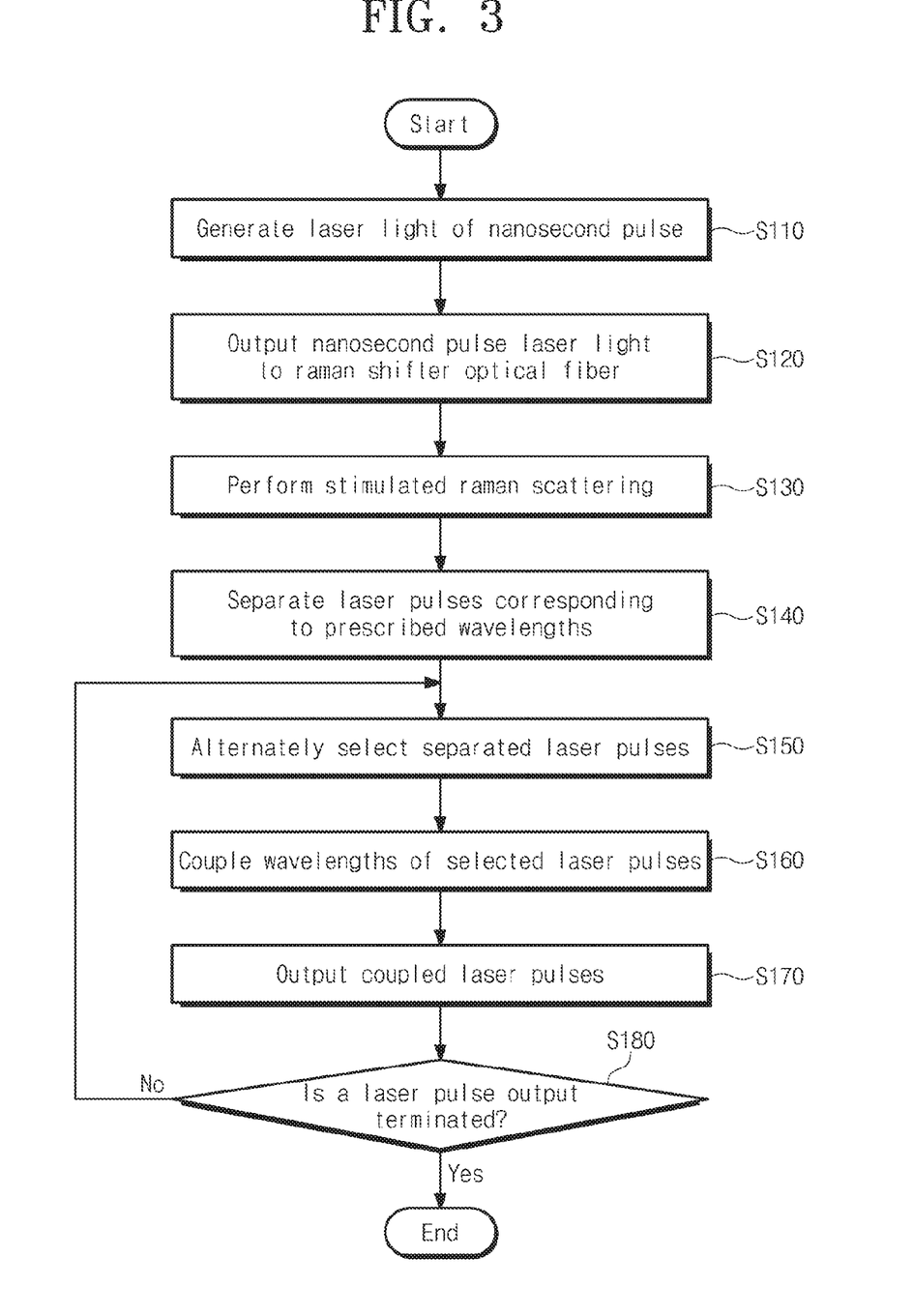
FIG. 3 illustrates an exemplary operation for outputting alternate laser wavelengths in a nanosecond pulse laser device according to the present invention.

FIG. 3 illustrates an exemplary operation for outputting alternate laser wavelengths in a nanosecond pulse laser device according to the present invention.

Referring to FIG. 3, the light source 110 generates nanosecond pulse laser light (operation S110). The light source 110 outputs the laser light to the lens 130 through the isolator 120.

The lens 130 collects the nanosecond pulse laser light to output the collected nanosecond pulse laser light to the Raman shift optical fiber 140 (operations S120).

The Raman shift optical fiber 140 generates pulse laser lights having a plurality of wavelengths from laser light input through the stimulated Raman scattering (operation S130). The Raman shift optical fiber 140 outputs the pulse laser lights to the wavelength separator 150.

The wavelength separator 150 separates the pulse laser lights corresponding to wavelengths selected from the input pulse laser lights (operation S140). For reference, the wavelength separator 150 in FIG. 1 separates two pulse laser lights corresponding to the two wavelengths $\lambda_1$ and $\lambda_2$. However, this is for convenience of explanation and the wavelength separator 150 may separate pulse laser lights corresponding to three or more wavelengths. The wavelength separator 150 outputs the separated pulse laser lights to the optical switch 160.

The optical switch 160 selects wavelengths of the separated pulse laser lights in order to be alternated (operation S150). The optical switch 160 selects wavelengths to be alternated in response to a switch control signal SW_CL input from the outside. Here, the switch control signal SW_CL is a signal generated by an external controller or a user input. The switch control signal SW_CL is a signal for selecting wavelengths of the input pulse laser lights so as to be mutually alternated.

The wavelength coupler 170 couples the wavelengths of the pulse laser lights alternately output from the optical switch 160 to generate one pulse laser light (operation S160). In the pulse laser light output from the wavelength coupler 170, two wavelengths are mutually alternated (in a sequence of $\lambda_1$, $\lambda_2$, $\lambda_1$, $\lambda_2$ . . . )

The wavelength coupler 170 outputs the pulse laser light in which wavelengths are coupled to be alternated (operation S170). In this way, the wavelength coupler 170 may output the pulse laser light with different wavelengths mixed and obtain, at once, images of different features for a subject according to wavelengths. For example, an image obtained through the pulse laser light of wavelength $\lambda_1$ and an image obtained through the pulse laser light of wavelength $\lambda_2$ are used for analyzing the different features. However, when the nanosecond pulse laser device 100 of the present invention is used, two images corresponding two wavelengths for analyzing two features may be obtained once through one scanning operation.

Next, the nanosecond pulse laser device 100 receives a signal for terminating an operation or determines whether power for operation is cut off (operation S180). Alternatively, the optical switch 160 may determine whether a signal for terminating a switching operation is input.

In operation S180, the signal input for the operation termination or the power cut-off operation is not generated, the procedure proceeds to operation S150. Through this, the optical switch 160 alternately selects the pulse laser lights of different wavelengths.

In operation S180, when the signal input for the operation termination or the power cut-off operation is generated, the nanosecond pulse laser device 100 terminates an operation for outputting the pulse laser lights.

Figure 4:
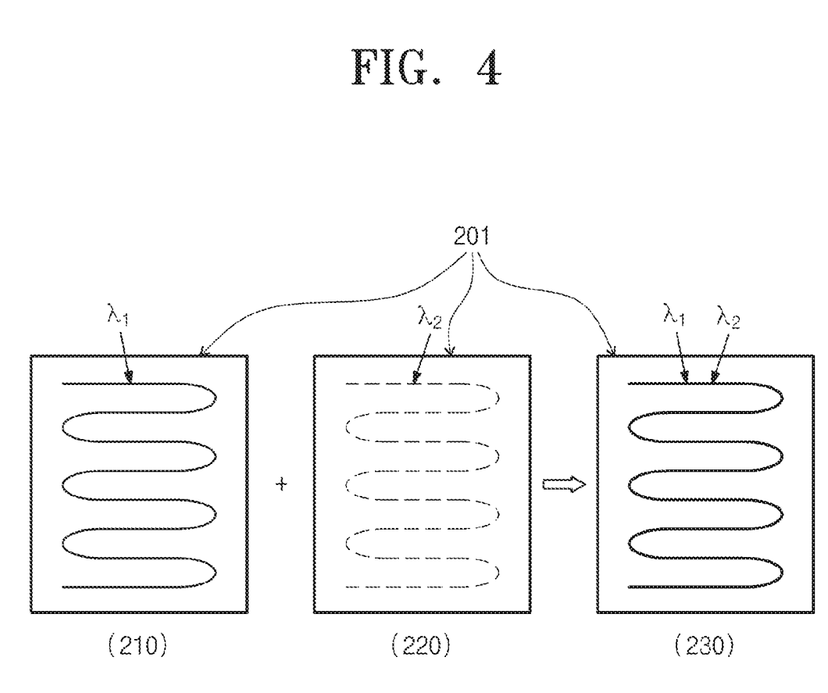
FIG. 4 illustrates an exemplary operation for irradiating alternate laser wavelengths on a subject according to the present invention.

FIG. 4 illustrates an exemplary operation for irradiating alternate laser wavelengths on a subject.

Referring to FIG. 4, a surface 201 of the subject is illustrated and an operation for scanning the surface 201 of the subject by using pulse laser light having a specific wavelength is illustrated.

In operation 210, the surface 201 of the subject is scanned with the pulse laser light having wavelength $\lambda_1$.

In operation 220, the surface 201 of the subject is scanned with the pulse laser light having wavelength $\lambda_2$.

In order to obtain an image corresponding to $\lambda_1$ and an image corresponding to $\lambda_2$, two times operations such as operations 210 and 220 are required to be performed. However, the nanosecond pulse laser device 100 of the present invention outputs pulse laser lights having alternate wavelengths.

In operation 230, the pulse laser lights having alternate wavelengths $\lambda_1$ and $\lambda_2$ scan the surface of the subject. At this point, the nanosecond pulse laser device 100 of the present invention obtains, at a time, the images obtained in operations 210 and 220 with one scanning operation by outputting the pulse laser lights having alternate wavelengths.

Through this, the nanosecond pulse laser device 100 proposed in the present invention may further shorten a time taken for obtaining images.

Figure 5:
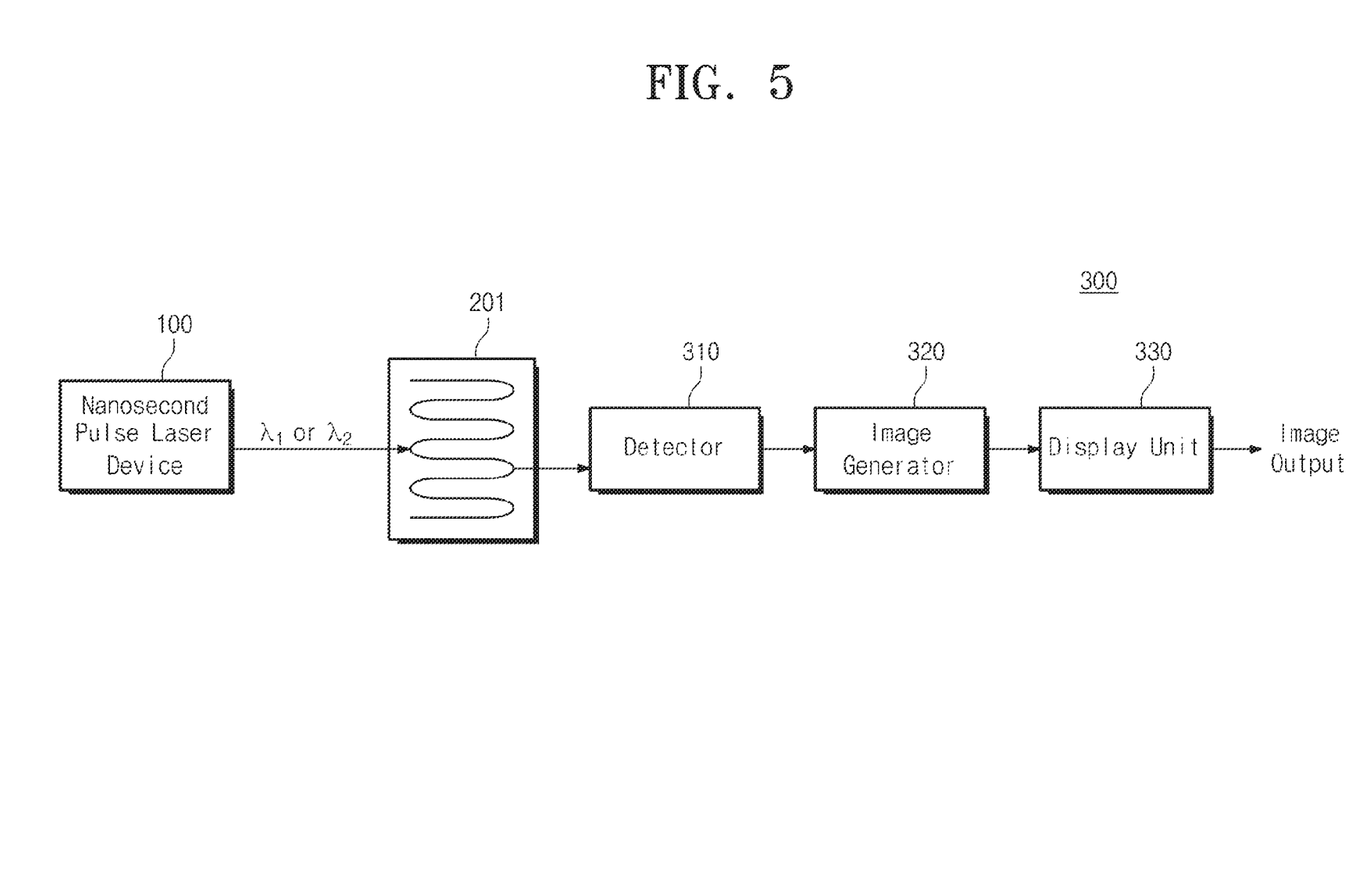
FIG. 5 illustrates an exemplary medical imaging device including a nanosecond pulse laser device according to the present invention.

FIG. 5 illustrates an exemplary medical imaging device including a nanosecond pulse laser device according to the present invention.

Referring to FIG. 5, a medical imaging device 300 includes the nanosecond pulse laser device 100, a detector 310, an image generator 320 and a display unit 330. Here, the medical imaging device 200 is for explaining utilization of the nanosecond pulse laser device 100, and may be used for devices other than the above-described medical imaging device.

The nanosecond pulse laser device 100 outputs pulse laser lights having adjustable repetition rate from tens kHz to hundreds kHz. In addition, the nanosecond pulse laser device 100 outputs pulse laser lights having mutually alternate wavelengths by using the wavelength separator 150, the optical switch 160, and the optical coupler 180.

The nanosecond pulse laser device 100 may emit the pulse laser lights having alternate wavelengths to the surface 201 of the subject for which an image is obtained. To this end, the nanosecond pulse laser device 100 may adjust an output direction of the pulse laser lights by using a scanner, etc.

At this point, the nanosecond laser device 100 outputs pulse laser lights having alternate wavelengths of $\lambda_1$ and $\lambda_2$.

The detector 310 detects a signal absorbed, scattered, or reflected by the surface 201 of the subject according to emission of the pulse laser lights. The detector 310 outputs detected information to the image generator 320.

The image generator 320 generates an image for displaying the basis of the detected information. For example, the image generator 320 generates a 2- or 3-dimensional image and outputs the generated image to the display unit 330. Here, the image generator 320 generates a plurality of images corresponding to the pulse laser lights having alternate wavelengths.

The display unit 330 displays the received images for outputting the images to a user.

On the other hand, an optical parametric oscillator (OPO) or the like applies pump laser light to a crystal in a resonator in order to use a second order nonlinear phenomenon, and has a structure in which a wavelength is changed according to a temperature applied to the crystal in the resonator and a resonator length. Accordingly, the OPO may not generate nanosecond pulse laser light having a high speed pulse repetition rate and alternate wavelengths.

However, the nanosecond pulse laser device proposed in the present invention uses a Raman shift optical fiber in order to use a Raman phenomenon and therefore does not require an OPO.

Accordingly, when the nanosecond pulse laser device proposed in the present invention is utilized, a high-speed real-time image may be obtained with high spatial resolution provided.

Furthermore, when the nanosecond pulse laser device proposed in the present invention is utilized, pulse laser lights in which different wavelengths are alternated are output and accordingly an image may be obtained with one scanning operation without performing a plurality of scanning operations. Accordingly, an image acquisition speed may be more improved.

While this invention has been described with reference to exemplary embodiments thereof, it will be clear to those of ordinary skill in the art to which the invention pertains that various modifications may be made to the described embodiments without departing from the spirit and scope of the present invention. Therefore, the scope of the present invention is not limited to the described embodiments but is defined by the claims and their equivalents.

INDUSTRIAL APPLICABILITY

The present invention relates to a laser device, and more particularly, to a nanosecond laser device and an alternate laser wavelength output method thereof capable of obtaining a high-speed image.

The invention claimed is:
1. A nanosecond pulse laser device comprising:
a light source configured to output laser light of a nanosecond pulse;
a lens configured to collect the laser light;
a Raman shift optical fiber configured to generate pulse laser lights corresponding to a plurality of wavelengths through stimulated Raman scattering from the collected laser light;
a wavelength separator configured to separate pulse laser lights of prescribed wavelengths from among the pulse laser lights;
an optical switch configured to select pulse laser lights of which wavelengths are mutually alternated from among the pulse laser lights output from the wavelength separator in response to a switch control signal applied from an outside; and a wavelength coupler configured to couple the pulse laser lights of which wavelengths are alternately output from the optical switch and output the coupled pulse laser light.

2. The nanosecond pulse laser device of claim 1, wherein the pulsed laser lights are coherent light.

3. The nanosecond pulse laser device of claim 1 further comprising:
   an isolator positioned between the light source and the lens and configured to block retro-reflection of the laser light output from the light source.

4. The nanosecond pulse laser device of claim 1, wherein the Raman shift optical fiber has a highest refractive index at a core of a central portion.

5. The nanosecond pulse laser device of claim 1, further comprising:
   a waveform generator configured to provide a first operation pulse to the light source and provide a second operation pulse to the optical switch,
   wherein a time period of the second operation pulse is at least two times of that of the first operation pulse such that an alternate pulse is output from the optical switch, and
   the time period is reciprocal to a frequency period.

6. An alternate laser wavelength output method of a nanosecond pulse laser device, the alternate laser wavelength output method comprising:
   outputting laser light of a nanosecond pulse;
   outputting the laser light to a Raman shift optical fiber;
   generating pulse laser lights corresponding to a plurality of wavelengths through stimulated Raman scattering of the Raman shift optical fiber;
   separating pulse laser lights corresponding to prescribed wavelengths;
   selecting the separated pulse laser lights to be mutually alternated; and
   coupling the pulse laser lights of which wavelengths are alternated and outputting the coupled pulse laser light.

7. The alternate laser wavelength output method of claim 6, wherein the pulse laser lights are coherent light.

8. The alternate laser wavelength output method of claim 6, wherein the Raman shift optical fiber is an optical fiber having a highest refractive index at a core of a central portion and a gradually decreased refractive index with distance away from the central portion.

9. The alternate laser wavelength output method of claim 6, wherein an operation period of an operation pulse for selecting the alternate wavelengths is at least two times of that of an operation pulse for generating the laser light, and the time period is reciprocal of a frequency period.

* * * * *